May 17, 1927.
A. B. KENNEDY
1,628,787
LEACHING METHOD AND APPARATUS
Filed Feb. 21, 1922
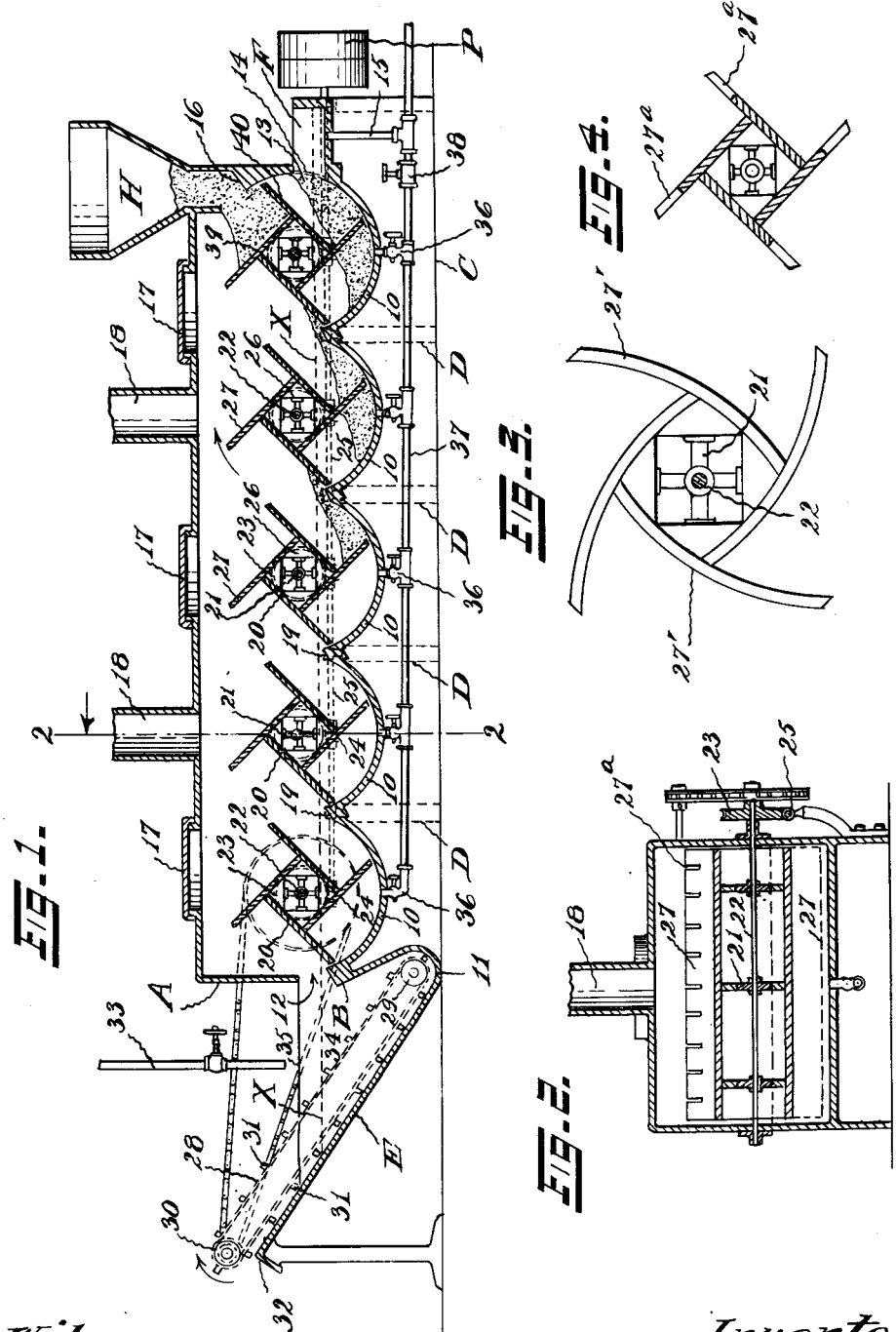
Witnesses:
Inventor:
Angus B. Kennedy,
By his Atty, Patented May 17, 1927.

1,628,787

UNITED STATES PATENT OFFICE.

ANGUS BERESFORD KENNEDY, OF CHARLOTTESVILLE, VIRGINIA.

LEACHING METHOD AND APPARATUS.

Application filed February 21, 1922. Serial No. 538,376.

The present invention relates to the leaching of solid materials containing soluble constituents adapted to be dissolved out or extracted therefrom, and relates more particularly to leaching apparatus and method of leaching for the extraction, by means of water or other suitable solvent, of tannin, dyes, etc. from wood-chips, bark, root and other substances; and one object is to provide an apparatus whereby the material to be leached is moved against a continuous flow of leaching agent or fluid of decreasing strength.

Another object is to provide an apparatus whereby the material to be leached is moved in segregated masses against a continuous flow of leaching fluid.

Another object is to provide an apparatus whereby the material to be leached is moved in segregated masses, each mass being prevented from commingling with another mass during leaching, and passing as substantially an individual mass from the point of first subjection to leaching to the point for discharge from the apparatus.

Another object is to provide an apparatus whereby the material to be leached is pushed down or immersed in the leaching fluid, and is not allowed to float on the surface, or suspended in an upper stratum of the current thereof.

Another object is to provide an apparatus whereby during leaching the material is partially drained and then deposited for further immersion in the leaching fluid, and the leaching fluid is baffled and dammed in its flow during the depositing of the material for such further immersion.

Another object is to provide an apparatus whereby the material during leaching is alternately immersed and partially drained.

Another object is to provide an apparatus having successive leaching sections operatively connected to constitute a continuous leaching chamber.

Another object is to provide an apparatus having successive leaching sections constituting a continuous leaching chamber whereby the material after each partial drainage thereof is brought into contact with the flow of weaker fluid coming from the successive leaching section wherein the material is next to be immersed.

Another object is to provide an apparatus having successive leaching sections constituting a continuous leaching chamber and means for providing baffling action tending to keep the fluid in the several leaching sections distinct, thereby lessening the possibility of "reverse infusion" or "by-passing" of the fluid.

Another object is to provide an apparatus of the character described of which all the parts coming into contact with the fluid may be made of wood, thereby obviating the use of acid resisting metal for such parts.

Another object is to provide a leaching apparatus which is of a simple construction, easy of operation, efficient in use, and of small cost of manufacture.

I accomplish the above objects by the invention, one embodiment of which is described by way of example in the subjoined specification, and shown in the accompanying drawings in which Figure 1, is a longitudinal sectional view of the apparatus.

Fig. 2 is a sectional view on the line 2—2 of Fig. 1.

Figure 3, is a detail sectional view of a paddle-wheel having a modified form of blades or paddles, and Figure 4, is a detail sectional view of a paddle-wheel, showing the slots in the blades thereof.

Similar reference characters denote similar parts throughout the several views.

The invention comprises the tank A, closed at its top, except for suitable hand-holes and means for ventilation, the tank being provided with a bottom, generally denoted by B, comprising a series of parallel concavo-convex portions 10, each of which serves as a leaching section or tub. The tank A is supported in an elevated position above a suitable foundation C as by the posts D. The leaching sections or tubs 10 may be made of wood-staves, metal or concrete; the sides, end walls and top of the tank preferably being of wood.

The tank A has at one end the extended portion E, supported at an upward incline, the extension E having at its lower end adjacent to and below the bottom of the tank a circular portion forming the boot 11, which rests upon the foundation C, the extension E being intended for supporting the conveyor, later described, for leached material.

The tank A has at its end adjacent to the extension E an opening 12 which provides for entrance from one direction of fluid into the tank, and also provides means for discharge therethrough in the opposite direction of leached material from the tank. The tank A has at its end opposite to the opening 12 an opening 13 for discharge of fluid, the opening 13 being provided with a screen or strainer 14 which permits passage of fluid but prevents passage of matter of bodily substance. The opening 13 communicates with the fluid reception chamber F formed by an extended portion of the end of the tank A, the fluid passing from the chamber F by the pipe 15 to a desired position or receptacle not shown.

The tank A has at its end opposite to the extension E the feed hopper H communicating with the interior of the tank, the tank having on its adjacent end wall, on its interior side, a slanting shoulder or projection 16 which serves as a guide surface for directing material towards the blades or paddles of the first operating one of the paddle-wheels later mentioned.

The tank A has in its top suitable handholes or inspection openings such as 17, and suitable ventilating means such as 18, for carrying off any vapors generated in the leaching process.

The leaching sections or tubs 10 are connected together to constitute a continuous leaching chamber in the tank A, being so arranged that the leaching fluid will flow over the flat narrow edge portion 19, formed between the sections or tubs, from one section or tub into the next adjacent section or tub, the purpose of the flat edge portion 19 being later stated.

Each leaching section or tub 10 has cooperating therewith a paddle-wheel 20, the paddle-wheels 20 all being of the same length, this length being substantially the width of the tank A.

Each paddle-wheel 20 comprises a hub 21 fixed on a shaft 22 turning in suitable bearings at each of its ends in the opposite sides of the tank A, each shaft 22 being provided with a worm wheel 23 located on the outside of the tank A and fixed on the outer end of shaft 22, the worm wheel engaging a worm 24 on a suitably supported main shaft 25 operatively connected to drive a wheel P which in turn is connected to a suitable supply of power, not shown. It will be noted that by arranging on the outside of the tank A the parts of the apparatus comprising the driving means, these parts are thereby removed from liability to the injurious effects of acids, wetting or moisture. The ends of the shafts 22 at the bearings may be packed or provided with stuffing-boxes in a well known manner, not shown, if considered necessary.

Each paddle-wheel preferably is of wood and has a mid-portion 26 which is secured to the hub 21, the mid-portion being enclosed on its four sides by side pieces having extending ends and providing relatively thin blades or paddles 27 for the paddle-wheel, there being four such blades or paddles for each wheel, the blades or paddles being offset tangentially relative to the shaft 22 to which they are appurtenant. Each blade 27 is provided with a series of narrow slots 27ᵃ extending inwardly from the edge of the blade, Fig. 4, for the passage of the leaching liquid therethrough, the slots 27ᵃ when the blades are immersed being wholly below the level of the material and permitting passage of the liquid through the blades and preventing "by-passing".

The blades or paddles 27 are of such length that when the paddle-wheel is rotated the outer end of the blade or paddle 27 will clear the interior surface of its cooperating leaching section or tub 10, but that the material to be leached will be prevented from passing therebetween.

Instead of blades or paddles of wood, metal plates or blades 27′ such as shown in Fig. 3 may be employed, which plates or blades may be perforated, in a manner readily understood, for passage of the fluid through the blades, and such metal plates or blades may be curved outwardly, or in direction away from the mid-portion of the paddle-wheel, for more readily freeing the paddles of the material moved thereby.

The conveyor 28 is of the drag type, one sprocket wheel 29 thereof being mounted in the boot 11 of the extension E, and the other sprocket wheel 30 thereof being mounted at the upper end of the extension E, the sprocket wheel 30 being driven from the nearest thereto of the shafts 22, the conveyor being so arranged that the drags 31 thereof will carry along the leached material discharged through the opening 12 of the tank A and discharge the same at the end 32 of the extension E.

The conveyor instead of being of the drag type may be of any other suitable design, such as spiral or belt type.

The leaching fluid is furnished to the tank A by the valve controlled pipe 33, being discharged from this pipe into the chamber 34 formed by the lower portion of the extension E and extended side walls 35 of the tank, the fluid passing from the chamber 34 through the opening 12 into the tank, and being maintained at an approximate level in the tank indicated by the line X.

Each of the leaching sections or tubs 10 is provided with a valve controlled means for drainage such as the vent 36, the vents 36 communicating with a pipe 37 suitably supported below the sections or tubs 10, this pipe extending longitudinally of the tank A, communicating with the fluid discharge pipe 15, and being valve controlled as at 38. The solvent or fluid can be heated by the introduction into the several leaching sections or tubs of steam jets, steam coils, jackets or even electricity, none of which is shown, in any well known and suitable manner.

In operation,

Referring to Fig. 1, and to the paddle-wheel at the extreme right hand side of said figure, the material being fed into the hopper H, guided by the shoulder 16 thereof, falls into the triangular space formed on the outer side of the mid-portion of the paddle-wheel by two blades or paddles 27 and one side of said mid-portion, this space, when the wheel is in the position shown, comprising a bottom portion 39 and a back 40. As the paddle-wheel rotates relatively slowly in the direction of the arrow, the extending blade or paddle 27 of the bottom portion 39 cuts off a mass of material from the supply in the hopper, which mass, by continued rotation of the wheel falls by gravity from the space comprised between the bottom portion 39 and back portion 40 into the first, or extreme right hand, of the leaching sections or tubs 10; as the paddle-wheel rotates the bottom portion 40 assumes a reverse position and the extending blade or paddle 27 thereof acts as a sweep for immersing or pushing the mass of material down into the fluid in said first section or tub 10, and sweeps or moves the mass through this section or tub and deposits it in the next successive section or tub, the action of the first paddle-wheel continuing throughout the period of operation of the apparatus. The action of the other paddle-wheels, with the exception of cutting off the material in masses from the hopper, is the same as that described in the case of the first paddle-wheel, the paddle-wheels all rotating at the same speed, and continuous movement of the material against the flow of the leaching fluid being provided.

It will be noted that the material is moved through the successive leaching sections or tubs in segregated masses, each mass being substantially the same bodily as cut off from the hopper; that each mass of material is alternately immersed in the fluid and partially drained by being lifted above the level of the leaching fluid; that the mass of material after such partial drainage is brought into direct contact with the weaker fluid flowing from the leaching section or tub in which the mass is next to be immersed; and that during such partial drainage the fluid is baffled or held back in the succeeding section or tub by the extending blade or paddle 27 of the paddle-wheel, and that the mass of material in course of deposit or immersion in the next successive section or tub forms a dam for the leaching fluid on and near the common flat narrow edge 19 of the adjacent sections or tubs, this edge portion being inclined towards the paddle wheel and dipping against the flow of the fluid for facilitating the formation of the dam, this baffling action of the blade or paddle and damming action of the material tending to prevent "reverse infusion" of the leaching fluid. If my apparatus consisted of a plain rectangular trough not separated into leaching sections by the narrow flat edge portions and without the paddle blades there would be a tendency for the leaching fluid to stratify, or at least for the weaker liquor to flow through the trough near its top without coming into direct contact with the material to be leached. Furthermore the material as it travels through the trough would carry with it a certain amount of strong liquor which mixing with the weaker liquor would increase the strength of the latter at the expense of the former, and this I term "reverse infusion" and provide the flat edge portions which in cooperation with the paddle blades cause the formation of dams of the material for preventing this "reverse infusion" and providing a partial drainage of the material.

Having thus described my invention, it should be understood that there may be modifications thereof and variations therein without departing from the spirit of the invention, or exceeding the scope of the appended claims.

What I claim and desire to protect by Letters Patent is:—

1. In leaching apparatus, in combination, a tank having a series of similar troughs arranged in side to side relation in the same horizontal plane and constituting the bottom of the tank and having flat edge portions, means for providing a continuous open stream of leaching fluid flowing through the tank longitudinally thereof at a normal level slightly above the edge portions of the troughs and across and into the troughs, and means appurtenant to each trough movable against the flow of the leaching fluid and adapted for immersing in the trough material to be leached, moving the material through the fluid in the trough, lifting the material out of the trough for draining the material, depositing the material in the next adjacent trough, and during said depositing forming a dam of the material on the edge portion between the trough to which said means is appurtenant and the next adjacent trough.

2. In leaching apparatus, in combination, a tank having side walls and a series of similar troughs arranged at their upper edges in side to side relation in the same horizontal plane and connected to each other along their side edges and constituting the bottom of the tank, means for providing a continuous open stream of leaching fluid flowing through the tank for substantially the full length of the tank at a normal level slightly above the connecting edge portions of the troughs and across and into the troughs, and means appurtenant to each trough movable against the flow of the leaching fluid and adapted for immersing in the trough mate-rial to be leached, moving the material through the fluid in the trough, lifting the material out of the trough for draining the material, and depositing the material in the next adjacent trough by a movement against the flow of said stream.

3. In leaching apparatus, in combination, a tank having side walls and a series of similar troughs connected in side to side relation by flat upper edge portions and constituting the bottom of the tank; said troughs being substantially semi-circular in cross-section; means for providing a continuous flow of leaching fluid through the tank at a normal level slightly above the connecting edge portions of the troughs; said edge portions having inclined faces dipping against the flow of said fluid; and a wheel appurtenant to each trough rotatable against the flow of the leaching fluid and provided with blades moving at their free ends in close proximity to the semi-circular interior surface of the trough for immersing in the trough material to be leached, moving the material through the fluid in the trough, lifting the material out of the trough for draining the material, depositing the material in the next adjacent trough, and during said depositing forming a dam of the material on the inclined edge face between the trough to which the wheel is appurtenant and the next adjacent trough, the blade next to the blade doing the lifting and depositing of the material providing means for baffling the flow of the fluid through the trough during said lifting and depositing.

4. In leaching apparatus, in combination, a tank having side walls and a series of similar troughs arranged in the same horizontal plane and connected in side to side relation along their side edges and extending transversely of the tank and constituting the bottom of the tank, said troughs being substantially semi-circular in cross-section; means for providing a continuous open flow of leaching fluid through the tank for substantially the full length of the tank at a normal level slightly above the connecting edge portions of the troughs and across and into the troughs; and a wheel for each trough revoluble against the flow of the leaching fluid and provided with blades moving at their free ends in close proximity to the semicircular interior surface of the trough for immersing in the trough material to be leached, moving the material through the fluid in the trough, lifting the material out of the trough for draining the material, and depositing the material in the next adjacent trough, the paddle blade next to the blade doing the lifting and depositing providing means for baffling the flow of the fluid through the trough during said lifting and depositing.

5. In leaching apparatus, in combination, a tank having side walls and a series of similar troughs arranged in the same horizontal plane and connected in side to side relation along their side edges and extending transversely of the tank and consituting the bottom of the tank, said troughs being substantially semicircular in cross section; means for providing a continuous open flow of leaching fluid through tank for substantially the full length of the tank at a normal level slightly above the connecting edge portions of the troughs and across and into the troughs; and a wheel appurtenant to each trough revoluble against the flow of the leaching fluid and provided with blades moving at their free ends in close proximity to the semicircular interior surface of the trough for immersing in the trough material to be leached, moving the material through the fluid in the trough, lifting the material out of the trough for draining the material, and depositing the material in the next adjacent trough; said blades being provided in their free end edges with slots which when the blades are immersed are wholly below the level of the material in the trough.

6. In leaching apparatus, in combination, a tank having side walls and a series of similar troughs arranged in the same horizontal plane and connected in side to side relation along their side edges and extending transversely of the tank and consituting the bottom of the tank; said troughs being substantially semicircular in cross-section; means for providing a continuous open flow of leaching fluid through the tank for substantially the full length of the tank at a normal level slightly above the connecting edge portions of the troughs and across and into the troughs; and a wheel appurtenant to each trough revoluble against the flow of the leaching fluid and provided with blades moving at their free ends in close proximity to the semicircular interior surface of the trough for immersing in the trough material to be leached, moving the material through the fluid in the trough, lifting the material out of the trough for draining the material, and depositing the material in the next adjacent trough; said blades extending in the trough for substantially the full length of the trough and being provided in their free end edges with a series of narrow slots which when the blades are immersed are wholly below the level of the material in the trough.

7. In leaching apparatus, in combination, a tank having a bottom consisting of a series of leaching sections constituting a continuous leaching chamber in the tank; said sections being connected by flat edge portions extending transversely of the tank; means for providing continuous flow of leaching fluid through the tank, the fluid flowing from section to section across the sections and over the flat edge portions; said edge portions having inclined faces dipping against the flow of the fluid; and means for moving material through the sections of the tank counter to the flow of the fluid for extracting soluble content from the material, the material when moved by said means forming dams on said inclined flat edge portions for retardation of the fluid.

8. In leaching apparatus, a tank having a bottom consisting of a series of leaching sections arranged in adjacent parallelism and all in the same horizontal plane and constituting a continuous leaching chamber extending longitudinally of the tank; means for providing an unbroken stream of leaching fluid through the tank and flowing across and into said sections and having its surface level above the edges of the sections; a source of supply of material to be leached by said fluid; and revoluble paddle blades appurtenant to each section for immersing the material in the fluid and moving the material through the fluid and lifting the material above the level of the fluid for draining the material and depositing the material in the next adjacent section; the sections having connecting edge portions provided with flat faces inclined in direction for cooperating with the paddle blades for forming dams of the material deposited on said faces by the paddle blades.

9. In apparatus of the character described having a tank with leaching fluid therein, a series of paddle wheels having blades for moving material through the fluid in the tank, the blades being provided in their free end edges with a series of narrow slots which when the blades are immersed are wholly below the level of the material in the tank.

10. The method of extracting soluble content from material by leaching which consists in successively immersing the material in segregated masses in a continuously flowing open stream of leaching fluid, successively moving the material in the same segregated masses through the fluid, successively lifting the material in the same segregated masses out of the fluid for draining the material and successively depositing the material in the same segregated masses in isolated positions in the stream of continuously flowing fluid.

11. The method of extracting soluble content from material by leaching which consists in successively immersing the material in segregated masses in a continuously flowing open stream of leaching fluid, successively moving the material in the same segregated masses through the fluid against the flow thereof, successively lifting the material in the same segregated masses out of the fluid for draining the material, successively depositing the material in the same segregated masses in isolated positions in the stream of continuously flowing fluid, and during said lifting and depositing baffling the flow of the fluid.

12. The method of extracting soluble content from material by leaching which consists in successively immersing the material in segregated masses in a continuously flowing open stream of leaching fluid, successively moving the material in the same segregated masses through the fluid against the flow thereof, successively lifting the material in the same segregated masses out of the fluid for draining the material, successively depositing the material in the same segregated masses in isolated positions in the fluid, and during the depositing forming dams of the material for retarding the flow of the fluid.

13. In leaching apparatus, a tank having a bottom consisting of a series of adjacent leaching sections arranged transversely of the tank and all in the same horizontal plane and constituting a continuous leaching chamber extending longitudinally of the tank; means for providing an unbroken stream of leaching fluid through the tank and flowing across and into said sections and having its surface level above the edges of the sections; and paddle blades for immersing the fluid in said sections and moving the material through the fluid and lifting the material above the level of the fluid and depositing the material in the next adjacent section; said paddle blades being provided in their free end edges with slots which when the blades are immersed are wholly below the level of the material in the sections.

14. In leaching apparatus, in combination, a tank having a bottom consisting of a series of leaching sections lying in the same horizontal plane; said sections being connected by flat edge portions extending transversely of the tank; means for providing an open continuous stream of leaching fluid through the tank, said stream in its continuous open flow passing from section to section across the sections and over said edge portions at a normal level slightly above the edge portions; said edge portions having inclined faces dipping against the flow of fluid; and means for moving material through said sections counter to the flow of the fluid for extracting soluble content from the material, the material when moved by said means forming dams on said inclined flat edge portions for retardation of the flow of fluid.

ANGUS BERESFORD KENNEDY.